United States Patent
Vernaleken et al.

[15] 3,687,895
[45] Aug. 29, 1972

[54] POLYMERS FROM UNSATURATED CARBONATE ESTERS OF PHENOLIC COMPOUNDS

[72] Inventors: Hugo Vernaleken; Georg Malamet, both of Krefeld; Ludwig Bottenbruch, Krefeld-Verdingen; Heinrich Krimm, Krefeld-Verdingen; Hermann Schnell, Krefeld-Verdingen, all of Germany

[73] Assignee: Farbenfabriken Bayer Aktiengesellschaft, Leverkusen, Germany

[22] Filed: Oct. 26, 1970

[21] Appl. No.: 84,214

Related U.S. Application Data

[63] Continuation-in-part of Ser. No. 813,316, April 3, 1969, abandoned.

[30] Foreign Application Priority Data

April 3, 1969  Germany..........P 17 70 144.9

[52] U.S. Cl........260/47 UA, 128/303, 260/46.5 UA, 260/47 XA, 260/77.5 UA
[51] Int. Cl.............................................C08f 15/02
[58] Field of Search......260/47 UA, 77.5 UA, 47 XA

[56] References Cited

UNITED STATES PATENTS 3,356,651  12/1967  Lee.....................260/77.5 UA
3,271,367  9/1966  Schnell........................260/49

*Primary Examiner*—Joseph L. Schofer
*Assistant Examiner*—C. A. Henderson, Jr.
*Attorney*—Robert A. Gerlach and Sylvia Gosztonyi

[57] ABSTRACT

The new polymeric compounds corresponding to the statistical formula

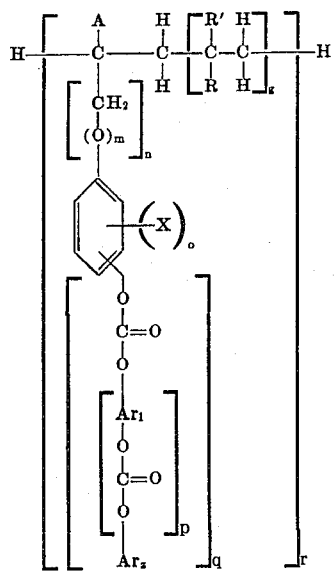

wherein A is hydrogen or a methyl group, X is halogen or a methyl group, $Ar_1$ is a bivalent aromatic radical which may or may not contain substitutents on the nucleus, $Ar_2$ is a monovalent aromatic radical which may or may not be substituted on the nucleus or it may be the same as $Ar_1$ but having an -OH group attached to one of the arylene valences; $m$ is 0 or 1; $n$ is 0 or 1; $o$ is 0, 1 or 2; $p$ is an integer of from about 5 to about 100; $q$ is 1 or 2; $r$ is an integer of from about 5 to about 1,000; $g$ is a number of from about 5 to about 200; $R'$ is hydrogen or a methyl group; R is hydrogen, halogen, lower alkyl, ayrl, a carboxylic acid or a ester group of a monohydric alcohol, the amide or nitrile group, an ester group of a monocarboxylic acid or an alkoxy group, are the subjects of this application.

8 Claims, No Drawings

POLYMERS FROM UNSATURATED CARBONATE ESTERS OF PHENOLIC COMPOUNDS

This application is a continuation-in-part of copending application Ser. No. 813,316, filed on Apr. 3, 1969 now abandoned.

The most commonly known polycarbonate materials are generally linear polymers which are commercially advantageous because of their thermoplastic and extremely durable nature. Notwithstanding, however, linear thermoplastic polycarbonates possess some inherent disadvantages due to their melt flow properties and their lack of stability to thermal and hydrolytic degradation, particularly when employed in the presence of steam, hot water, hydrolyzing liquids and the like. Such deficiencies have prevented the use of polycarbonate materials for the preparation of articles used daily such as crockery, containers and the like and also for the preparation of surgical materials and so on.

It is therefore an object of this invention to provide a new polymeric material which is devoid of the foregoing disadvantages.

Another object of this invention is to provide a new polymeric polycarbonate material having improved melt flow properties and increased stability to thermal and hydrolytic degradation.

Still another object of this invention is to provide a synthetic material which can be thermoplastically processed and which is suitable for the production of articles which must have high resistance to hot water, steam and hydrolytic fluids.

Still another object of this invention is to provide a new polymeric material suitable for use in the production of crockery, surgical instruments, containers, as raw materials for varnishes and so on.

The foregoing objects and others are accomplished in accordance with this invention, generally speaking, by providing as a new composition of matter a polymeric compound having the statistical formula:

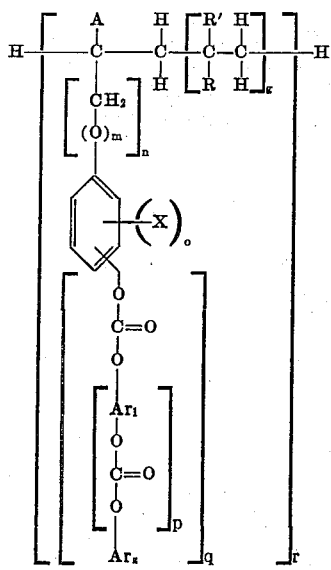

wherein A is hydrogen or a methyl group, X is halogen or a methyl group, $Ar_1$ is a bivalent aromatic radical which may or may not contain substituents on the nucleus such as, for example, phenylene, a-naphthalene, b-naphthalene, a-anthracene, g-anthracene, fluorene, phenanthrene, biphenylene, triphenylene and the like; $Ar_2$ is a monovalent aromatic radical which may or may not be substituted on the nucleus such as, for example, phenyl, naphthyl, anthryl, phenanthryl and the like; or it may be the same as $Ar_1$ but having an -OH group attached to one of the arylene valences; $m$ is 0 or 1; $n$ is 0 or 1; $o$ is 0, 1 or 2; $p$ is an integer of from about 5 to about 100; $q$ is 1 or 2; $r$ is an integer of from about 5 to about 1,000; $g$ is a number of from about 5 to about 200; $R'$ is hydrogen or a methyl group; R is hydrogen, halogen, lower alkyl, aryl, a carboxylic acid or ester group of a monohydric alcohol, the amide or the nitrile group, an ester group of a monocarboxylic acid or an alkoxy group such as, for example, fluorine, chlorine, bromine, iodine, lower alkyl, preferably having from about one to about eight carbon atoms, including methyl, ethyl, propyl, butyl, pentyl, octyl as well as the corresponding cycloaliphatic radicals, aryl radicals such as those described for $Ar_2$, an ester group of a monohydric alcohol, preferably those alcohols which contain from about one to about eight carbon atoms including methanol, ethanol, butanol, heptanol, octanol and the like; an ester group of a monocarboxylic acid including acetic, propionic, butyric, benzoic acid and the like; and alkoxy groups, preferably those containing from about one to about eight carbon atoms such as, for example, methoxy, ethoxy, allyloxy, hexoxy, heptoxy and so on.

In the foregoing statistical formula the segment which repeats $g$ number of times is prepared by copolymerizing unsaturated monomers containing substituents as defined for $R'$ and R. Thus, this segment of the polymer may be derived from a mixture of ethylenically unsaturated monomers in which case R may differ for each segment derived from each different monomer and $R'$ may or may not also vary or else it may be prepared from a single monomer which repeats a sufficient number of times to satisfy the number represented by $g$ in which case R and $R'$ may be the same in each repeating segment. In the former case, statistical formula I may be written as follows:

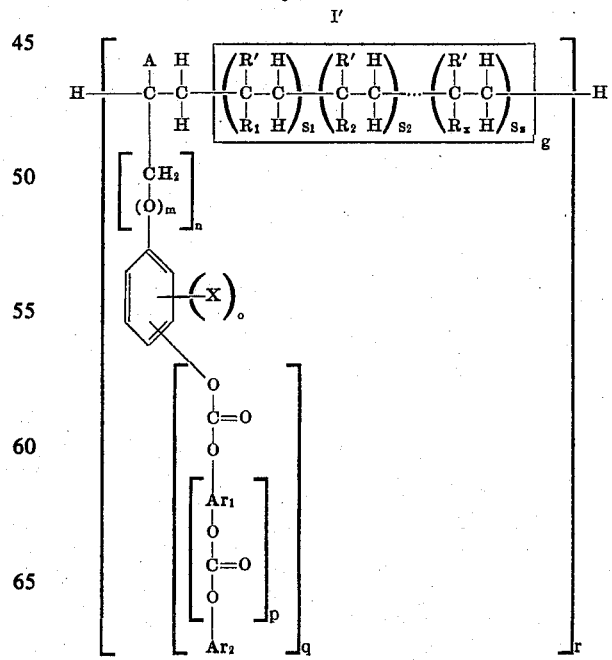

wherein all of the units are as hereinbefore defined and $R_1, R_2 \ldots R_x$ may be the same or different hydrogen, halogen, lower alkyl or aryl radicals, an ester group, the amide, the nitrile or the carboxylic acid group or an alkoxy group; $S_1, S_2 \ldots S_z$ are the same or different numbers and $S_1 + S_2 + \ldots S_z = g$. The most important compounds of this invention, however, correspond to the above formula in which $n$ and $o$ are 0 and $q$ is 1. Thus, the preferred formula is:

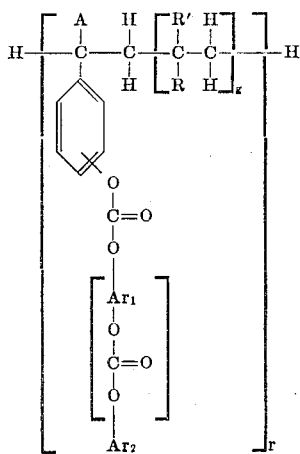

wherein

A is hydrogen or a methyl group;

$Ar_1$ is phenylene, diphenylene naphthylene, a diphenylene alkane, a diphenylene cycloalkane, a diphenylene ether, a diphenylene sulphide, a diphenylene ketone, a diphenylene sulphone or di-4-phenylene-4-diisopropylbenzene;

$Ar_2$ is phenyl, halophenyl or alkylphenyl in which the halo group is chlorine or bromine and the alkyl group contains one to four carbon atoms;

R is hydrogen, halogen, methyl, phenyl, -COOH or -COOR'' in which r'' is an alkyl group having one to eight carbon atoms, including cycloalkyl groups such as the cyclohexyl group;

R' is hydrogen or a methyl group;

$p$ is a number of from about 5 to about 100;

$g$ is a number of from about 5 to about 200; and $r$ is a number of from about 5 to about 1000.

The most preferred products are those of the above formula wherein $Ar_1$ is diphenylene-isopropylidene, di-3,5-dichloro-4-phenylene-isopropylidene, 1,1-diphenylene cyclohexane or di-4-phenylene-4-diisopropylidenebenzene.

The new compounds of this invention can be prepared by known methods from copolymers containing free or masked hydroxyphenyl side chains and having the formula:

II

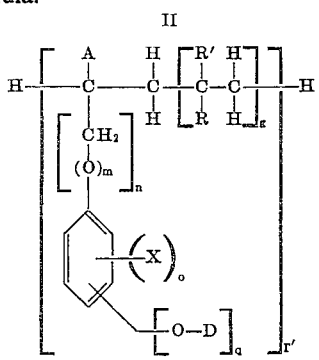

or, as explained for formula I,

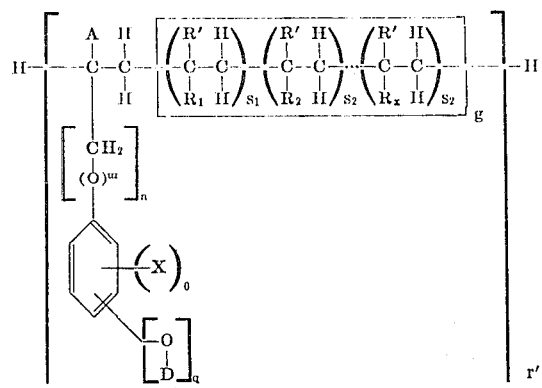

in which D is hydrogen or a chlorocarbonic acid ester, monophenyl-carbonic acid ester or trimethyl-silyl group; $r'$ is an integer of from about 5 to about 1000 and the remainder of the substituents are as already defined. Such copolymers are reacted with bivalent, optionally nuclear-substituted phenols and a carbonate precursor such as a derivative of carbonic acid. A monovalent phenol may also be employed, if desired, to chain terminate the reaction product.

The copolymers of formula II (and II') may be obtained by copolymerizing ethylenically unsaturated constituents with mono- or bivalent phenols of the formula

III

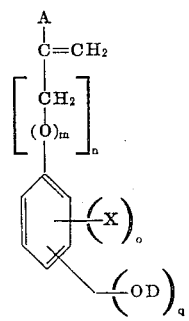

wherein A, X, D, $m$, $n$, $o$ and $q$ are as already defined. Thus, mono- and bivalent phenols such as, for example, o-, m- or p-isopropenyl-phenol, p-isopropenyl-o-cresol, 2,6-dichloro-p-isopropenyl-phenol, m- or p-vinylphenol, p-vinyl-o-cresol, p-allyl-phenol, m-allyloxy-phenol, 3,4-dihydroxyallyl-benzene, 2,4-dihydroxyallyl-benzene and the like, their chlorocarbonic acid or monophenyl-carbonic acid esters or the corresponding trimethyl-silane derivatives, are reacted with copolymerizable monomers of the formula

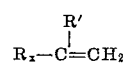

(wherein R' and $R_x$ are as already defined) in a molar ratio such that one part of the phenol of formula III is used to the sum of the parts of the copolymerizable monomer or mixtures thereof equal to $g$. Known methods may be used for effecting the copolymerization such as, for example, ionic copolymerization as described in German Pat. No. 1,153,527 or, preferably, free radical copolymerization, preferably with the use of masked phenols and especially the trimethylsilane derivatives. The last mentioned compounds are easily obtained by reacting the corresponding phenols with, for example, hexamethyl-disilazane or trimethyl-chlorosilane in the presence of acid acceptors.

In this process the preferred phenols are those of formula III wherein $n$ and $o$ are 0 and $q$ is 1. Thus, the preferred formula is:

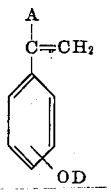

In preparing the copolymers of formula II, the monomers which may be used as reaction partners for the unsaturated phenols include, for example, ethylene, propylene, isobutylene, vinyl chloride, vinylidene chloride, acrylic and methacrylic acid, their alkyl esters and amides, acrylo- and methacrylonitrile, vinyl acetate, propionate and benzoate, vinyl-methyl, -ethyl and -isobutyl ether, styrene, a-methyl-styrene, vinyl-toluene, p-ethyl-styrene, 2,4-dimethyl-styrene, orthochlorostyrene, 2,5-dichlorostyrene and any of those listed in U.S. Pat. No. 3,225,119. Such compounds may be used either alone or in mixtures with one another.

Any suitable bivalent phenols may be mixed with the copolymers of formula II, including all those which are known to be suitable for the preparation of polycarbonates. Some such suitable compounds are, for example, hydroquinone, resorcinol, 4,4'-dihydroxydiphenyl, bis-(4-hydroxyphenyl)-alkanes such as bis-(4-hydroxyphenyl)-methane, -1,1-ethane, -1,1-and-2,2-propane, -1,1-and-2,2-butane and so on, 1,1-bis-(hydroxyphenyl)-cycloalkanes, -ethers, -sulphides, -ketones, -sulphones and the like as well as bisphenols which are halogenated on the nucleus, a,a'-bis-(p-hydroxyphenyl)-p-diisopropylbenzene and the like. Further examples of such suitable compounds may be found in U.S. Pat. Nos. 3,028,365; 2,999,835; 3,148,172; 3,271,368; 2,970,131; 2,991,273; 3,271,367; 3,280,078; 3,014,891; 2,999,846 and so on.

If copolymers with free hydroxyphenyl side chains or with phenylcarbonic acid ester or trimethyl-phenoxy-silane side chains are to be prepared, the reaction can be carried out using diesters of carbonic acid, preferably diaryl carbonates, such as diphenyl carbonate, the cresyl carbonates, dichlorophenyl carbonates, bisphenyl carbonates of bivalent phenols and the like in a transesterification reaction at temperatures of between about 150°C and about 350°C. in which alkaline or acidic transesterification catalysts may be employed in the usual amounts. Such reactions are described in detail in Chemistry and Physics of Polycarbonates by Hermann Schnell and Polycarbonates by Christopher and Fox, for example. If silane copolymers are used, the reaction is virtually the same as that of the copolymers carrying side chains of free hydroxyphenyl radicals as terminal groups since the trimethyl-silane radicals are easily split off because of intersilylation.

The polycarbonate side chains can also be prepared in a known manner by using phosgene or bischlorocarbonic acid esters of bivalent phenols in a homogenous solution or in a two-phase solvent mixture, according to the interfacial polycondensation method, using acid acceptors such as tertiary amines or alkali metals or alkaline earth metal hydroxides, preferably with the addition of catalysts, primarily tertiary amines. Such processes are described in detail in the patents and texts cited hereinbefore. The reaction temperatures for this process are usually between about 0°C and about 50°C. and the solvents used should be among those in which the copolymer and, preferably, also the final product are soluble. Some such suitable solvents are, for example, methylene chloride, chloroform, chlorobenzene and mixtures thereof and the like. In such solution processes, those copolymers in which the terminal groups of the side chains consist of phenyl-chlorocarbonic acid ester groups may also be used as well as phenol and trimethyl-phenoxy-silane copolymers.

Suitable monovalent aromatic compounds which may either be substituted or unsubstituted on their nucleus and from which the $Ar_2$ terminal groups of the formula are derived include, for example, phenol, cresols, mono- and dichlorophenols, p-tert.-butylphenol and any of those listed in the patents and texts cited hereinbefore.

The amount of the bivalent phenols and carbonic acid derivatives to be used per mol of the copolymer of formula II may vary within wide limits depending upon whether shorter or longer polycarbonate side chains are desired. However, at least 1 mol of bivalent phenol and carbonic acid derivative should be used for every phenolic hydroxyl group of the copolymer so that at least one carbonate or polycarbonate chain is grafted onto every phenol group of the copolymer. The preferred amounts can easily be calculated from the numerical value of $p$ in formula I.

As discussed hereinbefore the new polymeric compositions of this invention may contain substituents in addition to those specifically spelled out in the statistical formula. Thus, for example, any of the aromatic nuclei contained in the polymer may contain substituents as can any of the aliphatic groups. Any suitable substituent may thus be contained in the polymer but preferably those substituents which are inert to the reaction components during the production of the polymers. Some suitable substituents which may be employed include, for example, halogen atoms including fluorine, chlorine, bromine, iodine; lower alkyl radicals such as, for example, methyl, ethyl, butyl, hexyl and the like; alkoxy radicals such as, for example, methoxy, propoxy, hexoxy and the like; nitrile groups as already set forth herein; nitro groups, carboalkoxy groups such as, for example, carbomethoxy, carbobutoxy and the like; dialkyl amino groups such as, for example, dimethyl amino, dipropyl amino, methylethyl amino; mercapto; carbonyl; thiocarbonyl; phosphoryl; phosphato; siloxy and so on.

The new polymeric compounds of this invention are superior to the known linear polycarbonates due to their improved melt flow properties and their increased stability to thermal and hydrolytic degradation. Since the new polymers of this invention can be thermoplastically processed, they are particularly suitable for producing articles which must have an especially high resistance to hot water and steam as well as to fluids which cause hydrolysis upon the application of heat. Some such articles include, for example, articles used daily such as crockery, surgical instruments, containers and the like. The new polymeric compounds can also be used as raw materials for varnishes.

The invention is further illustrated but is not intended to be limited by the following examples in which all parts and percentages are by weight unless otherwise specified.

COPOLYMER $M_1$ $M_1$ is a product obtained by the copolymerization of about 475 parts of methyl methacrylate and about 25 parts of trimethyl-(p-isopropenylphenoxy)-silane in about 800 parts of ethyl glycol acetate in the presence of about 5 parts of azo-diisobutyronitrile under nitrogen at about 80°C. for about 11 hours. The product is precipitated with petroleum ether in the form of a colorless product. The outflow viscosity of the ethyl glycol acetate solution containing about 37.5 percent solids is about 257 seconds at 20°C. in a DIN beaker No. 6.

This product corresponds to formula II (and II') in which:

$R_1$ = a carboxy-methyl group,
$R'$ = a methyl group,
$S_1 = g = 40$,
$A$ = methyl,
$n = 0$,
$o = 0$,
$D$ = trimethyl-silyl,
$q = 1$,
$r'$ = appr. 13

COPOLYMER $M_2$ $M_2$ is a product obtained by the copolymerization of about 3960 parts of styrene, about 790 parts of acrylonitrile and about 250 parts of trimethyl-(p-isopropenylphenoxy)-silane in about 500 parts of chlorobenzene in the presence of about 25 parts of azo-diisobutyronitrile under nitrogen at about 80°C. for about 8 hours. A solution of this product in chlorobenzene containing about 40 percent solids has an outflow viscosity of about 200 seconds at about 20°C. in a DIN beaker No. 4.

This product corresponds to formula II (and II') in which:

$R_1$ or $R_2$ = a phenyl group,
$R_1$ or $R_2$ = a nitrile group,
$R'$ = hydrogen,
$S_1 = 1-31$ or $12.3$,
$S_2 = 1-12.3$ or $-31$,
$S_1 + S_2 = g = 43.3$,
$A$ = methyl,
$n = 0$,
$o = 0$,
$D$ = trimethyl-silyl,
$q = 1$,
$r'$ = appr.13

COPOLYMER $M_3$ $M_3$ is a product obtained by the copolymerization of about 1187.5 parts of methyl methacrylate, about 1187.5 parts of styrene and about 125 parts of trimethyl-(p-isopropenyl-phenoxy)-silane in about 2500 parts of chlorobenzene in the presence of about 12.5 parts of azo-diisobutyronitrile under nitrogen at about 80°C. for about 10 hours. A solution of this product in chlorobenzene containing about 50 percent solids has an outflow viscosity of about 82 seconds at about 20°C. in a DIN beaker No. 6.

This product corresponds to formula II (and II') in which:

$R_1$ or $R_2$ = a carboxymethyl group,
$R_1$ or $R_2$ = a phenyl group,
$R'$ = hydrogen or a methyl group,
$S_1 = 1-19.5$ or $-18.75$,
$S_2 = 1-18.75$ or $-19.5$,
$S_1 + S_2 = g = 38.25$,
$A$ = methyl,
$n = 0$,
$o = 0$,
$D$ = trimethyl-silyl,
$q = 1$,
$r'$ = appr. 11,6

COPOLYMER $M_4$ $M_4$ is a product obtained by the copolymerization of about 570 parts of butyl acrylate, about 380 parts of styrene and about 50 parts of trimethyl-(p-isopropenylphenoxy)-silane in about 1000 parts of xylene in the presence of about 10 parts of azo-diisobutyronitrile and about 2 parts of tert.-dodecylmercaptan under nitrogen at about 80°C. for about 32 hours. A solution of this product in chlorobenzene containing about 49 percent solids has an outflow viscosity of about 35 seconds at about 20°C. in a DIN beaker No. 4.

This product corresponds to formula II (and II') in which:

$R_1$ or $R_2$ = a carboxybutyl group,
$R_1$ or $R_2$ = a phenyl group,
$R'$ = hydrogen,
$S_1 = 1-18.3$ or $-15$,
$S_2 = 1-15$ or $-18.3$,
$S_1 + S_2 = g = 33.3$,
$A$ = methyl,
$n = 0$,
$o = 0$,
$D$ = trimethyl-silyl,
$q = 1$,
$r'$ = *appr. 7*

COPOLYMER $M_5$ $M_5$ is a product obtained by the copolymerization of about 150 parts of N-methoxymethyl methacrylamide, about 225 parts of butyl acrylate, about 100 parts of styrene and about 25 parts of trimethyl-(p-isopropenylphenoxy)-silane in about 500 parts of xylene and about 100 parts of n-butanol in the presence of about 5 parts of azo-diisobutyronitrile and about 1 part of tert.-dodecyl-mercaptan under nitrogen at about 80°C. for about 25 hours. The product is precipitated with petroleum ether in the form of a colorless powder.

This product corresponds to formula II (and II') in which:

$R_1$, $R_2$ or $R_3$ = a N-methoxy-methylamid group,
$R_1$ or $R_2$ or $R_3$ = a carboxy-butyl group,
$R_1$ or $R_2$ or $R_3$ = a phenyl group,
$R'$ = hydrogen or a methyl group, $S_1 = 1-8$ or $-14.7$ or $-9.7$,
$S_2 = 1-14.7$ or $-8$ or $-9.7$,
$S_3 = 1-9.7$ or $-14.7$ or $-8$,
$S_1 + S_2 + S_3 = g = 32.4$,
A = methyl,
$n = 0$,
$o = 0$,
D = trimethyl-silyl,
$q = 1$,
$r' = $ appr. 1000.

COPOLYMER $M_6$ $M_6$ is a product obtained by the copolymerization of about 79 parts of styrene, about 16 parts of acrylonitrile and about 5 parts of p-isopropenylphenyl-phenylcarbonate. (See German Pat. No. 1,193,031) in about 100 parts of xylene/dimethyl formamide 1:1 in the presence of about 0.2 part of azo-diisobutyronitrile under nitrogen at about 80°C. for about 11 hours. The product is precipitated with methanol.

This product corresponds to formula II (and II') in which:
$R_1$ or $R_2 = $ a phenyl group,
$R_1$ or $R_2 = $ a nitrile group,
$R' = $ hydrogen,
$S_1 = 1-38.6$ or $-15.8$,
$S_2 = 1-15.8$ or $-38.6$,
$S_1 + S_2 = g = 54.4$,
A = methyl,
$n = 0$,
$o = 0$,
D = the phenyl carbonate group,
$q = 1$,
$r' = $ appr. 5,5

COPOLYMER $M_7$ $M_7$ is a product obtained by the copolymerization of styrene and p-isopropenyl-phenol in a molar ratio of 10:1 using the process described in German Pat. No. 1,153,527.

This product corresponds to formula II (and II') in which:
$R_1 = $ a phenyl group,
$R' = $ hydrogen,
$S_1 = g = 10$,
A = methyl,
$n = 0$,
$o = 0$,
D = hydrogen
$q = 1$,
$r' = 5$.

EXAMPLE 1

A mixture of about 12 parts of copolymer $M_2$, about 16 parts of 2,2-bis-(4-hydroxyphenyl)-propane (bisphenol A), about 16.5 parts of diphenyl carbonate and about 0.001 part of the disodium salt of 2,2-bis-(4-hydroxyphenyl)-propane in a glass flask fitted with a stirrer and distillation device becomes molten at about 180°C. after two nitrogen changes. At intervals of about 30 minutes, the temperature is raised to 210°C, 240°C and 270°C. The pressure is simultaneously decreased to 100 mm Hg, 10 mm Hg and 1 mm Hg, respectively. The phenol which evolves and the excess diphenyl carbonate are distilled off. An after-condensation time of about 25 minutes is sufficient to achieve the desired viscosity. The relative viscosity of the condensation product is 1.41, measured in m-cresol at 25°C. at a concentration
$c = 0.1$ g in 100 cc.

This product corresponds to formula I (and I') in which the symbols have the same meaning as for copolymer $M_2$ except that D is absent and
$Ar_1 = $ a bisphenol A radical,
$Ar_2 = $ a phenyl radical,
$p = 24.2$ and
$r = r'$.

EXAMPLE 2

A mixture of about 5.3 parts of copolymer $M_3$, about 16 parts of bisphenol A, about 16.5 parts of diphenyl carbonate and about 0.0001 part of the sodium salt of bisphenol A is treated as described in Example 1. The relative viscosity of the condensation product is 1.90 measured in m-cresol at 25°C. at a concentration
$c = 0.1$ g in 100 ml.

This product corresponds to formula I (and I') in which the symbols have the same meanings as for copolymer $M_3$ except that D is absent and
$Ar_1 = $ a bisphenol radical,
$Ar_2 = $ a phenyl radical,
$p = 54$ and
$r = r'$.

EXAMPLE 3

A mixture of about 5.3 parts of copolymer $M_6$, about 16 parts of bisphenol A, about 16.5 parts of diphenyl carbonate and about 0.0001 part of the disodium salt of bisphenol A is condensed under the conditions described in Example 1. An after-condensation time of about 25 minutes suffices to achieve a relative viscosity of 1.52.

The product corresponds to formula I (and I') in which the symbols have the same meanings as for copolymer $M_6$ except that D is absent and
$Ar_1 = $ a bisphenol A radical,
$Ar_2 = $ a phenyl radical,
$p = 54$ and
$r = r'$.

EXAMPLE 4

About 1960 parts of phosgene are introduced, with stirring, during the course of about 2 hours at about 25°C. into a mixture of about 3420 parts of bisphenol A, about 72 parts of p-tert.-butylphenol and about 2150 parts of sodium hydroxide in about 12000 parts of water, and about 430 parts of copolymer $M_2$ and about 6 parts of triethylamine in about 34500 parts of methylene chloride. The viscous organic phase is separated and washed with water until neutral. About 3770 parts of a condensation product having a relative viscosity of 1.305, measured in methylene chloride at 25° C. at a concentration
$c = 0.05$ g/100 cc.
are obtained after precipitation with methanol.

This product corresponds to the formula I (and I') in which the symbols have the same meanings as for copolymer $M_2$ except that D is absent and
$Ar_1 = $ a bisphenol A radical, $Ar_2$ = a p-tert.-butylphenyl radical,
$p = 51.2$ and
$r = r'$.

EXAMPLE 5–12

The mixtures described in the following Table are reacted as described in Example 4 and the products are processed as described therein. The yields and viscosities achieved are set forth in the Table.

TABLE

| Example | Phosgene, parts | Bisphenol A, parts | p-Tert.-butyl phenol, parts | Sodium hydroxide, parts | Water, parts | Co-polymer | Parts | Methylene chloride (ml.) | Triethylamine, parts. | Yield, parts | $\eta$ rel. (c.= 5 g./1,000 ml. methylene chloride |
|---|---|---|---|---|---|---|---|---|---|---|---|
| 5 | 64 | 91.2 | 2.10 | 63 | 560 | $M_2$ | 60.1 | 800 | 0.2 | 100 | 1,313 |
| 6 | 50.5 | 68.4 | 2.20 | 63 | 560 | $M_2$ | 127 | 800 | 0.2 | 123 | 1,321 |
| 7 | 57 | 91.2 | 1.46 | 60 | 540 | $M_3$ | 106.6 | 800 | 0.2 | 143 | 1,305 |
| 8 | 42 | 68.4 | 1.54 | 50 | 450 | $M_3$ | 101.6 | 800 | 0.2 | 109 | 1.266 |
| 9 | 33 | 57.0 | 4.30 | 33 | 300 | $M_4$ | 127 | 600 | 0.2 | 112 | 1.109 |
| 10 | 33 | 57.0 | 4.30 | 33 | 300 | $M_5$ | 127 | 600 | 0.2 | 102 | 1,120 |
| 11 | 16.5 | 28.5 | 4.30 | 16.5 | 160 | $M_1$ | 31.7 | 430 | 0.2 | 47 | 1,247 |
| 12 | 42 | 68.4 | 1.20 | 50 | 450 | $M_1$ | 50.8 | 800 | 0.2 | 99 | 1,277 |

The products described in the Table correspond to formula I (and I') in which the symbols are the same as those for the corresponding copolymers $M_1$ to $M_5$ and $M_7$ except that D is absent and $Ar_1$ = a bisphenol A radical and $Ar_2$ = a p-tert. -butyl phenyl radical or, in Example 11, the $Ar_1$ radical with one hydroxyl group,
$r = r'$ and
the values for p are as follows:
Example 5: 27.3,
Example 6: 9.7,
Example 7: 15.5,
Example 8: 12.2,
Example 9: 8.1,
Example 10: 8.1,
Example 11: 16.2,
Example 12: 5.5,

EXAMPLE 13

About 10 parts of phosgene are introduced during the course of about 60 minutes at about 25°C. into a mixture of about 26 parts of $\alpha, \alpha'$-bis-(p-hydroxyphenyl)-p-diisopropyl about 1 part of p-tert.-butylphenol, about 9.5 parts of sodium hydroxide in about 100 ml of water, about 46.5 parts of copolymer $M_2$ and about 0.05 part of triethylamine in about 400 ml of methylene chloride. The organic phase is subsequently separated and washed with water until neutral. By precipitation with petroleum ether, about 42 parts of a condensation product having a relative viscosity of 1.168, measured in methylene chloride ($c = 0.05$ g/100 cc) are obtained.

This product corresponds to formula I (and I') in which the symbols have the same meanings as for copolymer $M_2$ except that D is absent and $Ar_1$ = a $\alpha, \alpha'$-bis-(p-hydroxyphenyl) -p-diisopropylbenzene radical,
$Ar_2$ = a p-tert.-butylphenyl radical,
$p = 6.8$ and
$r = r'$.

EXAMPLE 14

About 7.5 parts of phosgene are introduced, while stirring, during the course of about 50 minutes at about 25°C. into a mixture of about 17 parts of 1,1-bis-(hydroxyphenyl)-cyclohexane, about 1 part of phenol, about 7 parts of sodium hydroxide in about 100 ml of water, and about 46.5 parts of copolymer $M_2$ and about 0.02 part of triethylamine in about 400 ml of methylene chloride. After washing the organic phase with water condensation product neutral, about 37 g of a condensationproduct having a relative viscosity of 1.144 (methylene chloride, $c = 0.05$ g/100 cc) are obtained by precipitation with methanol.

This product corresponds to formula I (and I') in which the symbols have the same meanings as for copolymer $M_2$ except that D is absent and $Ar_1$ = a 1,1-bis-(4-hydroxyphenyl)-cyclohexane radical,
$Ar_2$ = a phenyl radical,
$p = 5.3$ and
$r = r'$.

EXAMPLE 15

About 12 parts of phosgene are introduced, while stirring, during the course of about 70 minutes at about 25°C. into a mixture of about 20.5 parts of bisphenol A, about 4 parts of 2,2-bis-(4-hydroxy-3,5-dichlorophenyl) -propane, about 0.12 parts of 2,6-dichlorophenol and about 11 parts of sodium hydroxide in about 200 ml of water, and about 23 parts of copolymer $M_2$ and about 0.02 part of triethylamine in about 300 ml of methylene chloride. The organic phase is separated, washed with water until neutral, and 31 g of a condensation product having a relative viscosity of 1.241 (methylene chloride, $c = 0.05$ g/100 cc) are separated from solution by the addition of acetone.

This product corresponds to formula I (and I') in which the symbols have the same meanings as for copolymer $M_2$ except that D is absent and $Ar_1$ = a bisphenol A or the tetrachloro-bisphenol A radical,
$Ar_2$ = a 2,6-dichlorophenyl radical or the $Ar_1$ radical with one hydroxyl group,
$p = 17.9$ and
$r = r'$.

It is to be understood that any of the components and conditions mentioned as suitable herein can be substituted for its counterpart in the foregoing examples and that although the invention has been described in considerable detail in the foregoing, such detail is solely for the purpose of illustration. Variations can be made in the invention by those skilled in the art without departing from the spirit and scope of the invention.

What is claimed is:

1. New polymeric compounds having the formula

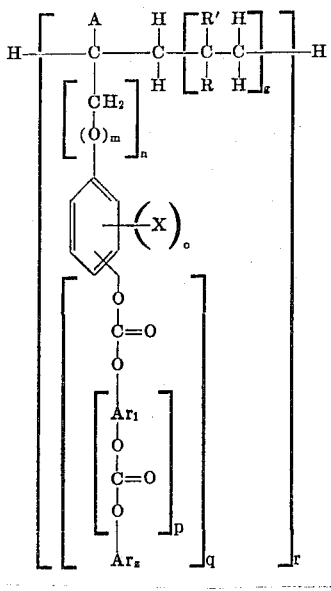

wherein A is hydrogen or a methyl group, X is halogen or a methyl group, Ar₁ is phenylene, diphenylene, naphthylene, a diphenylene alkane, a diphenylene cycloalkane, a diphenylene ether, a diphenylene sulphide, a diphenylene ketone, a diphenylene sulphone or di-4-phenylene-4-diisopropylbenzene; Ar₂ is phenyl, halophenyl or alkyl phenyl; m is 0 or 1; n is 0 or 1; o is 0, 1 or 2; p is an integer of from about 5 to about 100; q is 1 or 2; r is an integer of from about 5 to about 1,000; g is a number of from about 5 to about 200; R' is hydrogen or a methyl group, R is hydrogen, halogen, lower alkyl, phenyl, a carboxylic acid or ester group of a monohydric alcohol, the amide, N-methoxymethyl amide, or nitrile group, an ester group of a carboxylic acid or an alkoxy group.

2. The polymer of claim 1 having the formula:

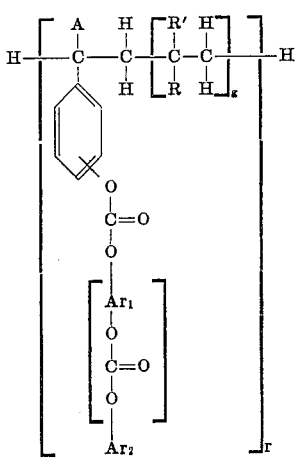

wherein
A is hydrogen or a methyl group;
Ar₁ is phenylene, diphenylene naphthylene, a diphenylene alkane, a diphenylene cycloalkane, a diphenylene ether, a diphenylene sulphide, a diphenylene ketone, a diphenylene sulphone or di-4-phenylene-4-diisopropylbenzene;
Ar₂ is phenyl, halophenyl or alkyl phenyl;
R is hydrogen, halogen, methyl, phenyl, -COOH or -COOR" wherein R" is an alkyl group having one to eight carbon atoms;
R' is hydrogen or a methyl group;
p is a number of from about 5 to about 100;
g is a number of from about 5 to about 200; and
r is a number of from about 5 to about 1000.

3. The polymer of claim 1 wherein the Ar₁ is a 2,2-bis-(4-hydroxyphenyl)propane, a,a'-bis-(p-hydroxyphenyl)-p-diisopropyl benzene, 1,1-bis-(4-hydroxyphenyl)-cyclohexane or 2,2-(bis-3,5-dichloro-4-hydroxyphenyl)propane radical.

4. The polymer of claim 1 wherein Ar₂ radical is phenyl, p-tertiary butyl phenyl or 2,6-dichlorophenyl.

5. The polymer of claim 1 wherein R is a carboxymethyl, phenyl, nitrile, carboxybutyl or an N-methoxymethylamide radical.

6. A method for preparing the polymer of claim 1 which comprises forming a prepolymer by copolymerizing an ethylenically unsaturated monomer with a phenol having the formula

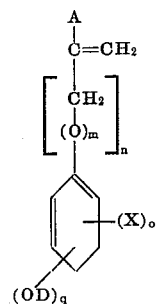

wherein A is hydrogen or a methyl radical, X is halogen or a methyl radical, D is hydrogen or a chlorocarbonic acid ester, monophenyl carbonic acid ester or trimethyl silyl radical, m is 0 or 1, n is 0 or 1, o is 0, 1 or 2 and q is 1 or 2 and reacting the resulting prepolymer with a bivalent phenol and a carbonate percursor selected from the group consisting of phosgene, a bischlorocarbonic acid ester of a dihydric phenol, a diaryl carbonate or a bis-(monoaryl carbonate) of a dihydric phenol.

7. The method of claim 6 wherein the phenol has the formula:

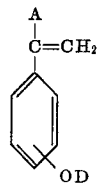

8. The method of claim 6 wherein the resulting prepolymer is also reacted with a monovalent phenol.

UNITED STATES PATENT OFFICE
CERTIFICATE OF CORRECTION

Patent No. 3,687,895　　　　　　　　Dated August 29, 1972

Inventor(s) Hugo Vernaleken, Georg Malamet, Ludwig Bottenbruch, Heinrich Krimm and Hermann Schnell It is certified that error appears in the above-identified patent and that said Letters Patent are hereby corrected as shown below:

Column 4, line 6, in the formula, last subscript in the box "$S_2$" should be --$S_z$--; line 9, "$(O)^w$" should be --$(O)_m$--. Column 9, line 60, "0.001" should be --0.0001--. In the Table bridging columns 11 and 12, last Copolymer "$M_1$" should be --$M_7$--; last column in the table, "1,313" should be --1.313--; "1,321" should be --1.321--; "1,120" should be --1.120--; "1,247" should be --1.247-- and "1,277" should be --1.277--.
Column 11, line 46, after "diisopropyl" insert -- -benzene, --.
Column 12, line 7, delete "condensation product" and insert --until--.

Signed and sealed this 20th day of February 1973.

(SEAL)
Attest:

EDWARD M. FLETCHER, JR.　　　　　　　ROBERT GOTTSCHALK
Attesting Officer　　　　　　　　　　Commissioner of Patents